United States Patent
Kuroda

(10) Patent No.: US 10,830,893 B2
(45) Date of Patent: Nov. 10, 2020

(54) OBSTACLE DETECTION DEVICE, TRAVELING APPARATUS, OBSTACLE DETECTION SYSTEM, AND OBSTACLE DETECTION METHOD

(71) Applicant: Sharp Kabushiki Kaisha, Sakai (JP)

(72) Inventor: Tatsuro Kuroda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 333 days.

(21) Appl. No.: 15/908,892

(22) Filed: Mar. 1, 2018

(65) Prior Publication Data
US 2018/0267170 A1    Sep. 20, 2018

(30) Foreign Application Priority Data

Mar. 17, 2017 (JP) ................... 2017-052601

(51) Int. Cl.
| | |
|---|---|
| *G01S 17/931* | (2020.01) |
| *G01S 17/89* | (2020.01) |
| *G06K 9/00* | (2006.01) |
| *G01S 15/931* | (2020.01) |
| *G01S 15/04* | (2006.01) |
| *G01S 15/86* | (2020.01) |
| *G01S 17/86* | (2020.01) |

(52) U.S. Cl.
CPC ............ *G01S 17/931* (2020.01); *G01S 15/04* (2013.01); *G01S 15/86* (2020.01); *G01S 15/931* (2013.01); *G01S 17/86* (2020.01); *G01S 17/89* (2013.01); *G06K 9/00805* (2013.01)

(58) Field of Classification Search
CPC .... G01S 13/931; G01S 15/931; G01S 17/931; G01S 13/86; G01S 13/862; G01S 13/865; G01S 13/867; G01S 17/86
See application file for complete search history.

(56) References Cited

U.S. PATENT DOCUMENTS 5,940,011 A * 8/1999 Agravante ........... H01Q 21/205
340/903
9,672,446 B1 * 6/2017 Vallespi-Gonzalez ......................
G05D 1/0251
(Continued)

FOREIGN PATENT DOCUMENTS

JP       61-113281 U     7/1986
JP     2005-341450 A    12/2005
(Continued)

*Primary Examiner* — Peter M Bythrow
(74) *Attorney, Agent, or Firm* — Keating & Bennett, LLP

(57) ABSTRACT

A traveling apparatus has a mounted obstacle detection device including a plurality of obstacle detection units configured to detect an obstacle and a control unit configured to control detection by the obstacle detection units. The obstacle detection device includes, as the obstacle detection units, an ultrasonic sensor and a LIDAR sensor. The LIDAR sensor is configured to be capable of detecting an obstacle within a detection range for the ultrasonic sensor and detecting an obstacle within a range which extends farther than the detection range for the ultrasonic sensor. The control unit controls detection such that, if a detection range for either one of the ultrasonic sensor and the LIDAR sensor becomes undetectable, the other sensor complements the undetectable range.

13 Claims, 10 Drawing Sheets

(56) References Cited

U.S. PATENT DOCUMENTS

| | | | |
|---|---|---|---|
| 2004/0012516 A1* | 1/2004 | Schiffmann | G01S 13/723 |
| | | | 342/70 |
| 2005/0062615 A1* | 3/2005 | Braeuchle | G01S 13/867 |
| | | | 340/903 |
| 2007/0075875 A1* | 4/2007 | Danz | G01S 15/931 |
| | | | 340/932.2 |
| 2008/0211708 A1* | 9/2008 | Haberland | G01S 13/87 |
| | | | 342/27 |
| 2015/0266472 A1* | 9/2015 | Ferguson | G05D 1/027 |
| | | | 701/23 |
| 2016/0026255 A1* | 1/2016 | Katz | G06K 9/00201 |
| | | | 345/156 |
| 2017/0115387 A1* | 4/2017 | Luders | G01S 17/86 |
| 2017/0248963 A1* | 8/2017 | Levinson | B60Q 1/525 |
| 2017/0294127 A1* | 10/2017 | Nakatani | G01S 13/87 |
| 2017/0359561 A1* | 12/2017 | Vallespi-Gonzalez | |
| | | | G06T 7/593 |
| 2018/0025234 A1* | 1/2018 | Myers | B60R 1/00 |
| | | | 348/148 |
| 2019/0293782 A1* | 9/2019 | Suryanaryana | G01S 13/931 |
| 2019/0353774 A1* | 11/2019 | Chondro | G01S 13/931 |
| 2019/0377814 A1* | 12/2019 | Shtrom | G06K 9/00805 |

FOREIGN PATENT DOCUMENTS

| | | |
|---|---|---|
| JP | 2008-292168 A | 12/2008 |
| JP | 2009-235820 A | 10/2009 |

* cited by examiner

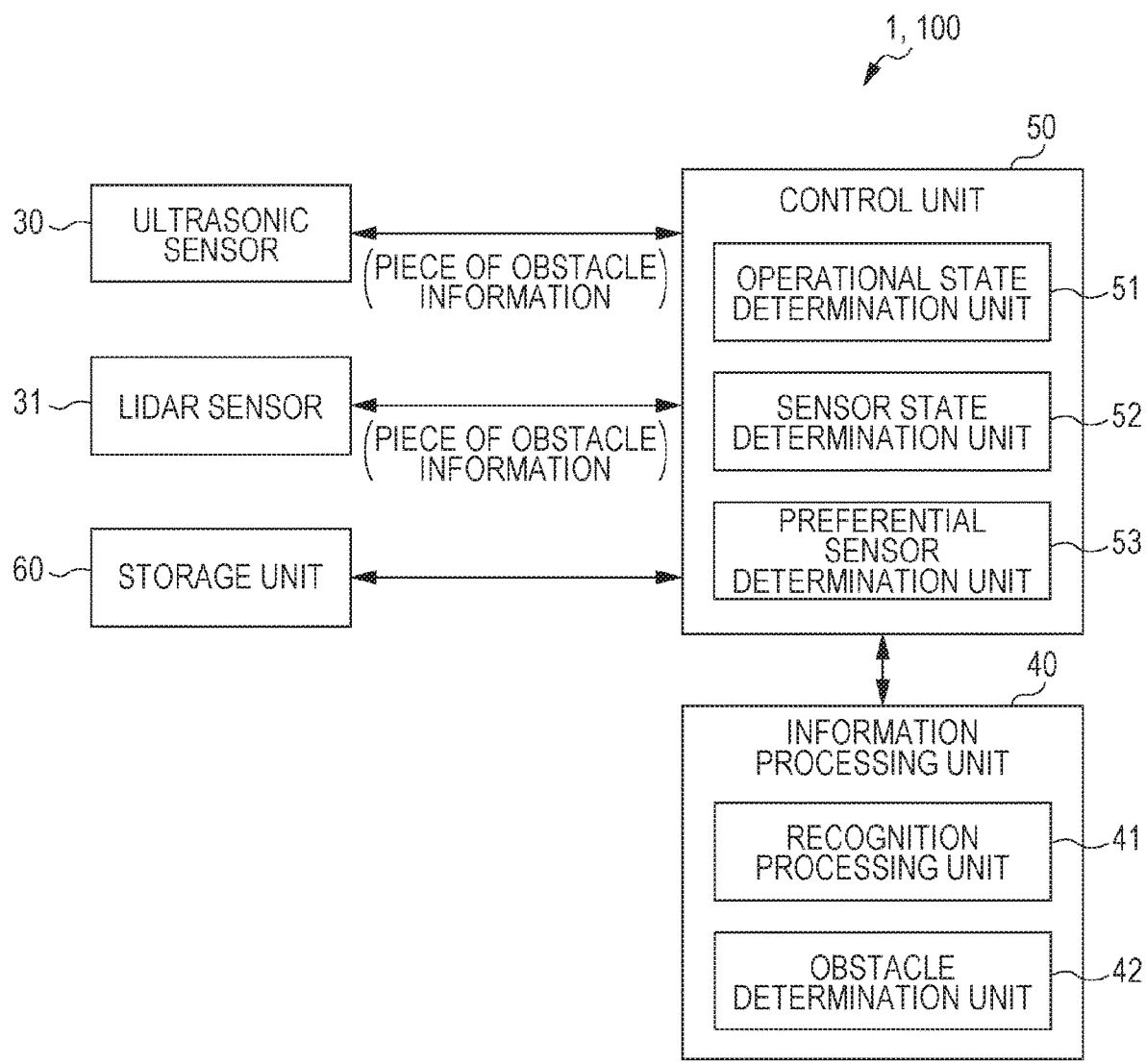

OBSTACLE DETECTION DEVICE, TRAVELING APPARATUS, OBSTACLE DETECTION SYSTEM, AND OBSTACLE DETECTION METHOD

BACKGROUND

1. Field

The present disclosure relates to an obstacle detection device, a traveling apparatus, an obstacle detection system, and an obstacle detection method and, more particularly, to an obstacle detection device, a traveling apparatus, an obstacle detection system, and an obstacle detection method including an obstacle detection unit configured to detect an obstacle in surroundings of the apparatus.

2. Description of the Related Art

Known conventional traveling apparatuses having a mounted monitoring device include an autonomous traveling vehicle including an information detection unit which detects information on surroundings of the vehicle.

Known autonomous traveling vehicles (for example, a self-propelled robot) include one which measures a distance to an obstacle in surroundings of the vehicle by driving a plurality of mounted detection elements (information detection units).

In a case using an ultrasonic sensor as a detection element, a plurality of elements mounted on a self-propelled robot are driven, thereby measuring a distance to an obstacle around the self-propelled robot. However, if a substance (for example, a dry leaf, snow, a stone, or projections and depressions of a vehicle body) is put on a portion of an ultrasonic sensor, at which sound waves are emitted, or something (for example, mud, sand, or snow) adheres to the portion, a decision may be made due to erroneous sensing to stop traveling despite the absence of a problem with traveling.

As an example of related art, there is disclosed a configuration of a vehicle opening and closing control system for opening and closing an opening and closing body of a vehicle, which includes a driving unit configured to drive the opening and closing body such that the opening and closing body is opened and closed, an ultrasonic sensor configured to sense an obstacle in surroundings of the vehicle, and a control unit configured to drive the driving unit on the basis of a sensing result from the ultrasonic sensor and control the opening and closing body such that the opening and closing body is opened and closed and provides a mask period with no reception by the ultrasonic sensor to inhibit the ultrasonic sensor from erroneous detection (Japanese Unexamined Patent Application Publication No. 2009-235820).

According to the above-described configuration, the provision of a mask period with no reception by the ultrasonic sensor makes it possible to cancel detection during a fixed period and perform reliable detection at the time of need.

In the above-described technique according to Japanese Unexamined Patent Application Publication No. 2009-235820, a mask period is provided for the ultrasonic sensor, which allows the one ultrasonic sensor to set a time of detection in a planned manner. The technique, however, suffers from the problem of becoming incapable of detection if something is put in front of a detection unit of the sensor or something (for example, mud, sand, or snow) adheres during traveling.

The present disclosure has been made in view of the conventional problem. It is desirable to provide an obstacle detection device, a traveling apparatus, an obstacle detection system, and an obstacle detection method capable of inhibit erroneous sensing and implementing stable sensing with a simple configuration at the time of detection of a piece of surroundings information.

SUMMARY

In order to cope with the above-described problem, an obstacle detection device, a traveling apparatus, an obstacle detection system, and an obstacle detection method according to the present disclosure are as described below.

According to the present disclosure, there is provided an obstacle detection device mounted on a traveling apparatus and including an obstacle detection unit configured to detect an obstacle and a control unit configured to control detection by the obstacle detection unit. The obstacle detection unit includes, as components, a first obstacle detection unit configured to detect an obstacle within a predetermined range and a second obstacle detection unit configured to detect an obstacle within a predetermined range through detection processing different from detection processing by the first obstacle detection unit, the first obstacle detection unit and the second obstacle detection unit are arranged such that a part of a detection range for the first obstacle detection unit and a part of a detection range for the second obstacle detection unit overlap with each other, and the control unit performs control so as to change a detection condition for either one of the first obstacle detection unit and the second obstacle detection unit in accordance with a detection result from the other obstacle detection unit.

According to the present disclosure, there is also provided an obstacle detection device mounted on a traveling apparatus and including an obstacle detection unit configured to detect an obstacle, a control unit configured to control detection by the obstacle detection unit, and an information detection unit configured to detect a traveling state or information on surroundings. The obstacle detection unit includes, as components, a first obstacle detection unit configured to detect an obstacle within a predetermined range and a second obstacle detection unit configured to detect an obstacle within a predetermined range through detection processing different from detection processing by the first obstacle detection unit, the first obstacle detection unit and the second obstacle detection unit are arranged such that a part of a detection range for the first obstacle detection unit and a part of a detection range for the second obstacle detection unit overlap with each other, and the control unit performs control so as to give priority to a detection result from either one of the first obstacle detection unit and the second obstacle detection unit in accordance with a detection result from the information detection unit.

According to the present disclosure, there is also provided a traveling apparatus having a mounted obstacle detection device, the obstacle detection device including an obstacle detection unit configured to detect an obstacle and a control unit configured to control detection by the obstacle detection unit. The obstacle detection unit includes, as components, a first obstacle detection unit configured to detect an obstacle within a predetermined range and a second obstacle detection unit configured to detect an obstacle within a predetermined range through detection processing different from detection processing by the first obstacle detection unit, the first obstacle detection unit and the second obstacle detection unit are arranged such that a part of a detection range for the first obstacle detection unit and a part of a detection range for the second obstacle detection unit overlap with each other, and the control unit performs control so as to change a detection condition for either one of the first obstacle detection unit and the second obstacle detection unit in accordance with a detection result from the other obstacle detection unit.

According to the present disclosure, there is also provided an obstacle detection system using an external server and a traveling apparatus having a mounted obstacle detection device including an obstacle detection unit configured to detect an obstacle in surroundings of the apparatus. The obstacle detection device is controlled so as to perform detection in accordance with an instruction from the external server, the obstacle detection unit includes, as components, a first obstacle detection unit configured to detect an obstacle within a predetermined range and a second obstacle detection unit configured to detect an obstacle within a predetermined range through detection processing different from detection processing by the first obstacle detection unit, the first obstacle detection unit and the second obstacle detection unit are arranged such that a part of a detection range for the first obstacle detection unit and a part of a detection range for the second obstacle detection unit overlap with each other, the external server includes a control unit configured to control detection by the obstacle detection unit, and the control unit performs control so as to change a detection condition for either one of the first obstacle detection unit and the second obstacle detection unit in accordance with a detection result from the other obstacle detection unit.

According to the present disclosure, there is also provided an obstacle detection method in an obstacle detection device which is mounted on a traveling apparatus and detects an obstacle in surroundings of the traveling apparatus, including a first obstacle detection process of detecting an obstacle within a predetermined range, a second obstacle detection process of detecting an obstacle within a predetermined range through detection processing different from detection processing in the first obstacle detection process, a process of arranging a detection range for the first obstacle detection process and a detection range for the second obstacle detection process such that a part of the detection range for the first obstacle detection process and a part of the detection range for the second obstacle detection process overlap with each other, and a process of performing control so as to change a detection condition for either one of the first obstacle detection process and the second obstacle detection process in accordance with a detection result from the other obstacle detection process.

BRIEF DESCRIPTION OF THE DRAWINGS

FIG. 4 is a block diagram showing an electrical configuration of the traveling apparatus;

DESCRIPTION OF THE EMBODIMENTS

First Embodiment

Modes for implementing provision of a traveling apparatus having a mounted obstacle detection device according to the present disclosure will be described below with reference to the drawings.

Figure 1:
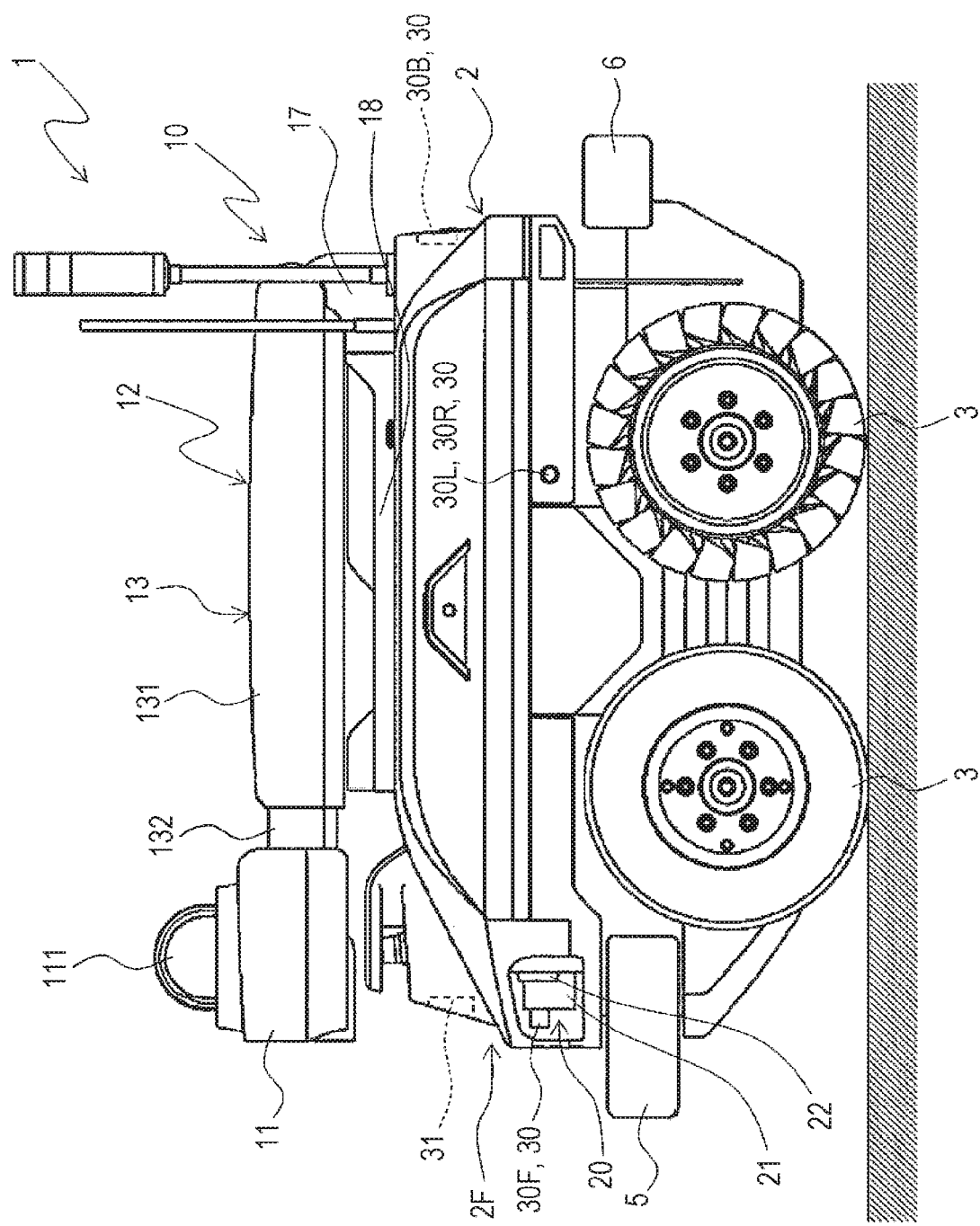
FIG. 1 is an explanatory view in side view showing an overall configuration of a traveling apparatus according to a first embodiment.
Figure 2:
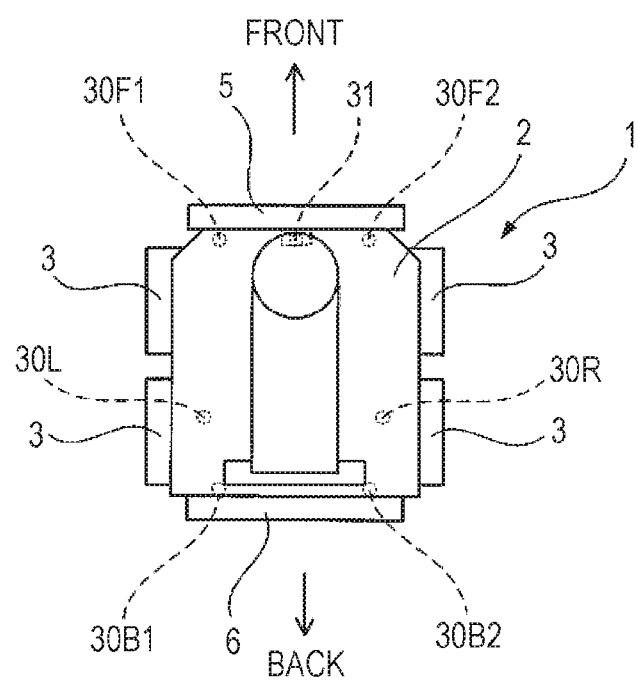
FIG. 2 is an explanatory view showing a state of installation of ultrasonic sensors in the traveling apparatus.
Figure 3:
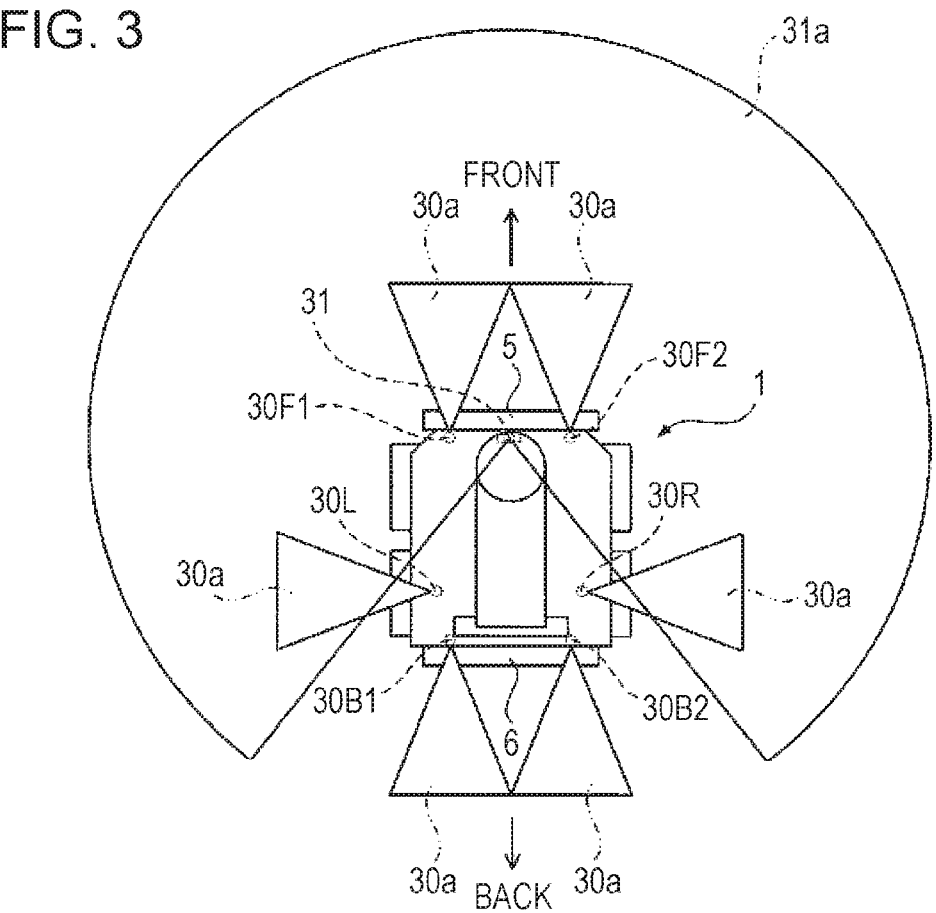
FIG. 3 is an explanatory view showing detection regions for the ultrasonic sensors in the traveling apparatus.

FIG. 1 shows an example of a mode for carrying out the disclosure and is an explanatory view in side view showing an overall configuration of a traveling apparatus according to a first embodiment. FIG. 2 is an explanatory view showing a state of installation of ultrasonic sensors in the traveling apparatus, and FIG. 3 is an explanatory view showing detection regions for the ultrasonic sensors in the traveling apparatus.

A traveling apparatus 1 according to the first embodiment is a traveling apparatus functioning as an autonomous traveling vehicle having a mounted obstacle detection device which includes a plurality of obstacle detection units configured to detect an obstacle in surroundings of the apparatus and a control unit configured to control detection by the obstacle detection units. As shown in FIG. 1, the traveling apparatus 1 has wheels 3 arranged on a chassis 2, has an elevating device 10 mounted on the chassis 2, and includes illuminating lamps 20 which illuminate an area ahead of the vehicle on two left and right sides of a vehicle body front 2F to perform monitoring traveling.

The term autonomous traveling vehicle here refers to an apparatus which travels autonomously by a machine or a program without human judgment. Examples of a known autonomous traveling vehicle include an autonomous industrial delivery vehicle which transports an object in a factory and a security vehicle.

A schematic configuration of the traveling apparatus 1 according to the first embodiment will be described first with reference to the drawings.

As shown in FIG. 1, in the traveling apparatus 1, four wheels 3 are provided on the rectangular chassis 2, and each two ones of the wheels 3 arranged in a chassis longitudinal direction (front-back direction) are driven by an electric motor (not shown) serving as a common power source.

The traveling apparatus 1 is capable of performing drive control of the left and right wheels 3 independently of each other and can change a running direction using a difference in rotation between the left and right wheels 3. By making rotation directions of the left and right wheels 3 opposite to each other, the traveling apparatus 1 is capable of stationary turning based on a so-called skid-steer scheme that is on-the-spot turning.

As shown in FIG. 1, the elevating device 10 includes an elevating mechanism 12 which elevates an elevating unit 11 and a driving unit 17 which drives the elevating mechanism 12.

The elevating unit 11 is provided with a monitoring device 111 which includes a camera.

The driving unit 17 is fixed to a base 18 which is arranged at an upper portion of the chassis 2 of the traveling apparatus 1.

The base 18 is configured such that the elevating mechanism 12 is arranged substantially parallel to an upper portion of the base 18 when the elevating mechanism 12 is down.

The elevating device 10 may be configured as a one-piece unit structure including the base 18 and be detachably attached to the chassis 2.

The elevating mechanism 12 is configured to include a boom 13 which is coupled to the elevating unit 11.

The boom 13 is configured to be pivotable in a vertical direction by the driving unit 17 and configured so as to vertically elevate or lower the elevating unit 11. The boom 13 includes a first boom member 131 and a second boom member 132 and is configured such that the first boom member 131 is pivotable in the vertical direction and such that the second boom member 132 is extensible from the first boom member 131.

Note that the boom 13 may be configured to be turnable in a horizontal direction above the base 18.

Bumpers 5 and 6 are provided on a front side and a rear side of the chassis 2 so as to extend in a vehicle width direction.

The illuminating lamps 20 are arranged at positions above the bumper 5 of the chassis 2 so as to be recessed.

Each illuminating lamp 20 includes, as components, a headlight (headlamp) 21 as a first illuminating lamp and a spotlight (beam light) 22 as a second illuminating lamp for intimidatory illumination by a particular light-emitting action.

Obstacle detection units which monitor an area ahead of the vehicle, left and right areas lateral to the vehicle, and an area behind the vehicle, respectively, are arranged on the chassis 2.

In the first embodiment, a plurality of ultrasonic sensors 30 are provided as first obstacle detection units. As for the ultrasonic sensors 30, ultrasonic sensors 30F1 and 30F2 are arranged on the two left and right sides in the vehicle width direction of the vehicle body front 2F of the chassis 2 in the traveling apparatus 1, ultrasonic sensors 30B1 and 30B2 are arranged on two left and right sides in the vehicle width direction of a rear portion of the chassis 2, and ultrasonic sensors 30L and 30R are arranged at substantially central portions on two left and right sides of the chassis 2, as shown in FIGS. 1 to 3. That is, an obstacle in surroundings of an outer perimeter of the traveling apparatus 1 can be captured by the ultrasonic sensors 30F1, 30F2, 30B1, 30B2, 30L, and 30R. Reference character 30a denotes a detection range for the ultrasonic sensor 30 (a first detection range).

As described above, the traveling apparatus 1 is configured to detect an obstacle, a suspicious substance, a suspicious individual, and the like on a traveling route by including the plurality of ultrasonic sensors 30.

Although the ultrasonic sensor 30 is used as a first obstacle detection unit in the first embodiment, a laser sensor may be used. A laser sensor applies a laser beam from a light-emitting unit and senses reflected light reflected by a surface of an obstacle with a light-receiving unit, thereby measuring a distance to the obstacle on the basis of a time period from light emission to light reception.

A laser imaging detection and ranging (LIDAR) sensor 31 is provided as a second obstacle detection unit in the vicinity of a central portion of the vehicle body front 2F of the chassis 2. The LIDAR sensor 31 detects an obstacle at a long distance through laser application and analyzes a distance to the obstacle and the obstacle.

In the first embodiment, the LIDAR sensor 31 is configured to be capable of detecting an obstacle within at least a part of the detection ranges 30a for the ultrasonic sensors 30 and detecting an obstacle within a detection range (a second detection range) 31a which extends farther than the detection range for the ultrasonic sensor 30, as shown in FIG. 3.

An electrical configuration of the traveling apparatus 1 according to the first embodiment will next be described with reference to a block diagram.

FIG. 4 is a block diagram showing the electrical configuration of the traveling apparatus according to the first embodiment.

As shown in FIG. 4, the traveling apparatus 1 according to the first embodiment includes, as components of an obstacle detection device 100, an information processing unit 40 which processes pieces of obstacle information acquired by the ultrasonic sensors 30 and the LIDAR sensor 31, a control unit 50 which controls traveling of the traveling apparatus 1 on the basis of the pieces of obstacle information, and a storage unit 60 which stores pieces of obstacle information acquired by the ultrasonic sensors 30.

The information processing unit 40 includes a recognition processing unit 41 and an obstacle determination unit 42.

The recognition processing unit 41 recognizes the position of an obstacle in surroundings. The obstacle determination unit 42 recognizes an obstacle and determines whether there is an obstacle (an object to be detected) in surroundings of the traveling apparatus 1.

The control unit 50 characteristically includes an operational state determination unit 51, a sensor state determination unit 52, and a preferential sensor determination unit 53.

The operational state determination unit 51 determines whether the traveling apparatus 1 is in a straight traveling state, a backward traveling state, or a turning state. The sensor state determination unit 52 determines a state of detection by each of the ultrasonic sensors 30 and the LIDAR sensor 31, for example, whether dirt is adherent to a detection unit, on the basis of pieces of detection information obtained through detection by the ultrasonic sensors 30 and the LIDAR sensor 31. The preferential sensor determination unit 53 determines to which one of detection results from the ultrasonic sensors 30 and a detection result from the LIDAR sensor 31 priority is to be given, on the basis of a determination result from the sensor state determination unit 52.

In the first embodiment, the control unit 50 characteristically controls detection such that, if a detection range for either one of the obstacle detection units of the ultrasonic sensors 30 and the LIDAR sensor 31 has an undetectable range, the other obstacle detection unit complements the undetectable range.

The storage unit 60 stores the detection range 30a set in advance for each ultrasonic sensor 30 and the detection range 31a set in advance for the LIDAR sensor 31 in the traveling apparatus 1.

Detection processing by the ultrasonic sensor 30 will be described with reference to the drawings.

Figure 5A:
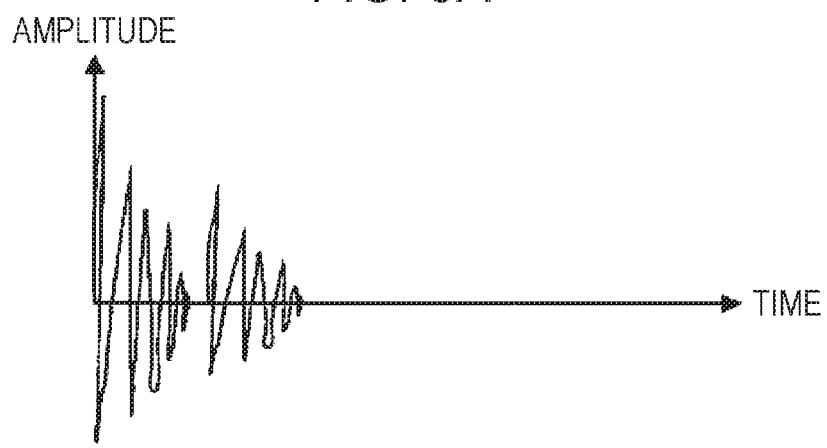
FIG. 5A is an explanatory chart showing a state of obstacle detection by one of the ultrasonic sensors partly constituting an obstacle detection device according to the first embodiment.
Figure 5B:
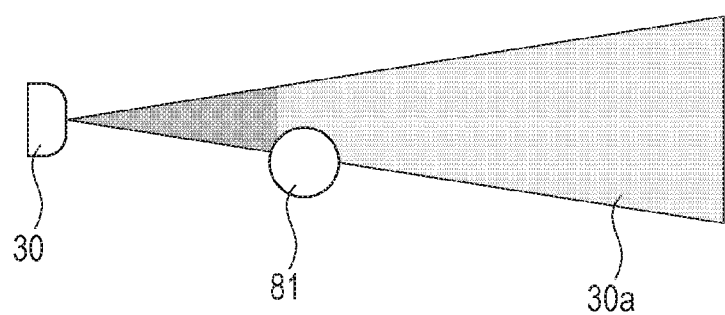
FIG. 5B is an explanatory diagram showing a positional relationship between a detection range for the ultrasonic sensor and an obstacle at a short distance.
Figure 6A:
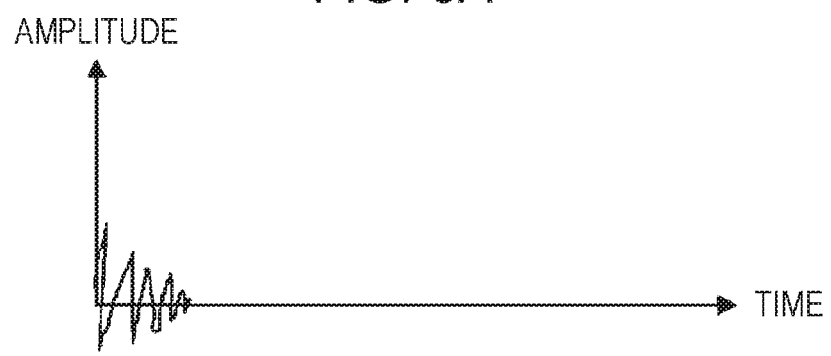
FIG. 6A is an explanatory chart showing a state of detection of an adherent substance on the ultrasonic sensor by the ultrasonic sensor.

FIG. 5A is an explanatory chart showing a state of obstacle detection by one of the ultrasonic sensors partly constituting the obstacle detection device according to the first embodiment, and FIG. 5B is an explanatory diagram showing a positional relationship between a detection range for the ultrasonic sensor and an obstacle at a short distance. FIG. 6A is an explanatory chart showing a state of detection of an adherent substance on the ultrasonic sensor by the ultrasonic sensor, and FIG. 6B is an explanatory diagram showing a positional relationship between the detection range for the ultrasonic sensor and the adherent substance.

If an obstacle 81 is present nearby, an emitted sound wave is reflected by the obstacle 81 and detected by the ultrasonic sensor 30, as shown in FIGS. 5A and 5B. That is, a reflected sound wave is detected in accordance with a distance to the obstacle 81. A sound wave emitted and reflected is plotted with the ordinate representing amplitude and the abscissa representing time, as shown in FIG. 5A.

Figure 6B:
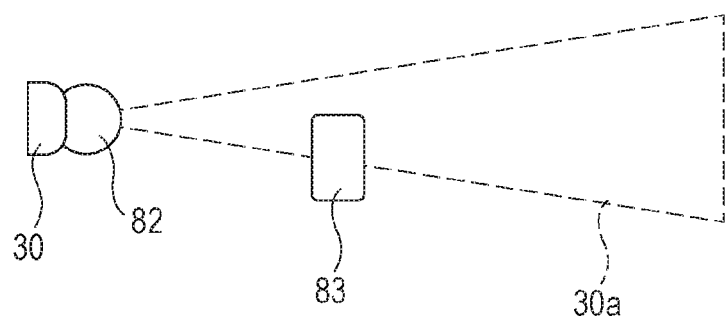
FIG. 6B is an explanatory diagram showing a positional relationship between the detection range for the ultrasonic sensor and the adherent substance.

If an adherent substance 82 is present on the ultrasonic sensor 30, an emitted sound wave does not go out, as shown in FIGS. 6A and 6B, and it may be erroneously determined that there is no reflected wave. In this case, for example, even if there is an obstacle 83 beyond the adherent substance 82, it may be determined that there is no obstacle. In another case, a sound wave reflected by the adherent substance 82 at the moment of emission of the sound wave may return, and it may be erroneously determined that there is an obstacle at an exceedingly short distance.

The same applies to the LIDAR sensor 31.

For this reason, in the traveling apparatus 1 according to the first embodiment, the ultrasonic sensor 30 and the LIDAR sensor 31 are arranged as two types of obstacle detection units and are controlled such that one complements the detection range for the other. If one sensor becomes incapable of detection, the other sensor can perform detection.

Sensing action by the traveling apparatus 1 according to the first embodiment will be described below with reference to the drawings.

Figure 7:
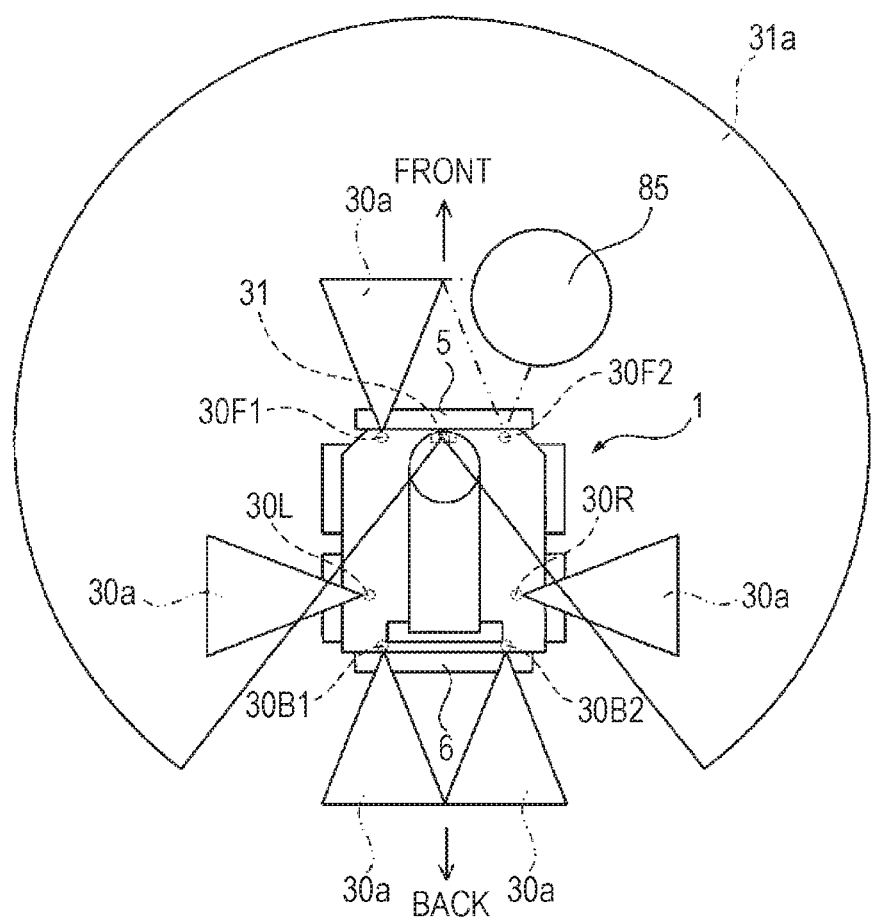
FIG. 7 is an explanatory view showing a state of detection when there is an adherent substance on one of the ultrasonic sensors partly constituting the obstacle detection device.
Figure 8:
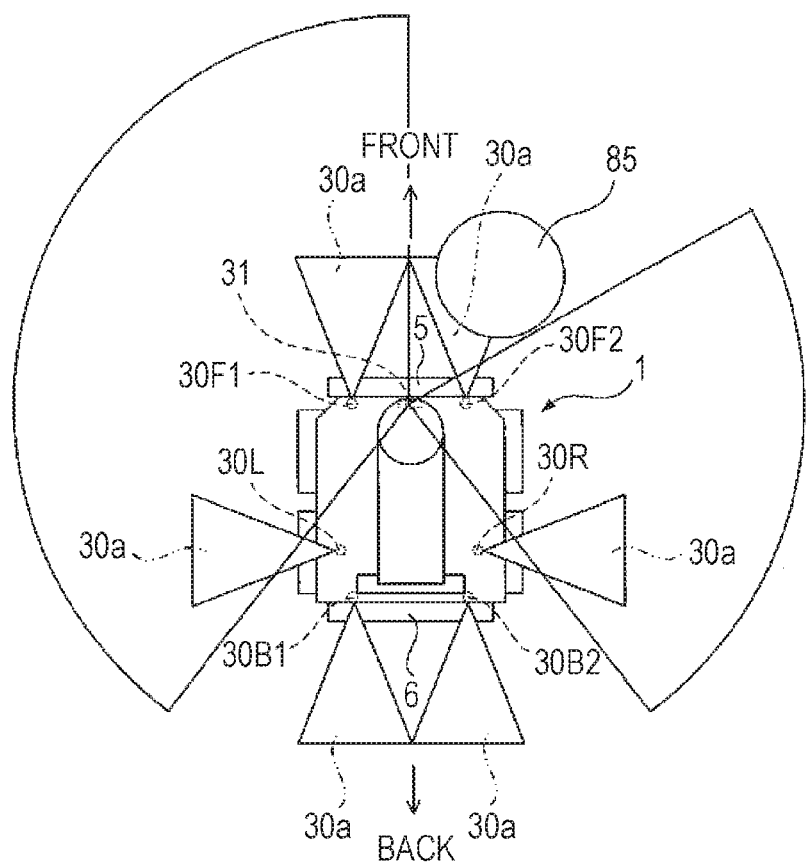
FIG. 8 is an explanatory view showing a state of detection when there is an adherent substance on a LIDAR sensor partly constituting the obstacle detection device.

FIG. 7 is an explanatory view showing a state of detection when there is an adherent substance on one of the ultrasonic sensors partly constituting the obstacle detection device according to the first embodiment, and FIG. 8 is an explanatory view showing a state of detection when there is an adherent substance on the LIDAR sensor partly constituting the obstacle detection device.

In the traveling apparatus 1 according to the first embodiment, an obstacle 85 is present within the detection range 30a for the ultrasonic sensor 30F2 of the ultrasonic sensors 30, as shown in FIG. 7. The obstacle 85 is also present within the detection range 31a for the LIDAR sensor 31.

If there is an adherent substance on the ultrasonic sensor 30F2 in the above-described case, the ultrasonic sensor 30F2 is incapable of detecting the obstacle 85. If the sensor state determination unit 52 determines that there is an adherent substance on the ultrasonic sensor 30F2, the preferential sensor determination unit 53 gives priority to detection action by the LIDAR sensor 31 that is successful in detecting the obstacle 85.

In the information processing unit 40, the obstacle determination unit 42 determines the presence or absence of an obstacle on the basis of a detection result from the LIDAR sensor 31.

As described above, even if the ultrasonic sensor 30F2 becomes incapable of detection, the LIDAR sensor 31 can complement the detection range for the ultrasonic sensor 30F2.

If there is an adherent substance on the LIDAR sensor 31 in the traveling apparatus 1 according to the first embodiment, as shown in FIG. 8, and a region where the obstacle 85 is present is undetectable, the preferential sensor determination unit 53 gives priority to detection action by the ultrasonic sensor 30F2 that is successful in detecting the obstacle 85.

In the information processing unit 40, the obstacle determination unit 42 determines the presence or absence of an obstacle on the basis of a detection result from the ultrasonic sensor 30F2.

As described above, even if a part of the detection range for the LIDAR sensor 31 becomes undetectable, the ultrasonic sensor 30F2 can complement a region which is undetectable by the LIDAR sensor 31.

For example, if a semitransparent adherent substance or a water droplet adheres to the LIDAR sensor 31, noise may occur at a distance of about 1 to 2 m within the detection range, and sensing determination processing may fail to function properly. An obstacle can be reliably sensed by taking into consideration a detection result from the ultrasonic sensor 30 for an area with such noise.

In the traveling apparatus 1 according to the first embodiment with the above-described configuration, at the time of sensing action, the obstacle detection device 100 performs control such that a sensor successful in detecting an obstacle complements a sensing range for a sensor incapable of detecting the obstacle by combining a plurality of sensors different in detection processing, such as the ultrasonic sensors 30 and the LIDAR sensor 31. With utilization of detection results from the sensors, it is possible to avoid erroneous sensing of an adherent substance and implement efficient sensing. This allows avoidance of deceleration and stoppage of the traveling apparatus 1 due to erroneous determination and a dangerous situation with no reaction to an obstacle.

Note that a modification may be such that an alarm notifying that "there is an adherent substance on a sensor" is given if the ultrasonic sensor 30 or the LIDAR sensor 31 becomes incapable of sensing in the traveling apparatus 1 according to the first embodiment.

If a result of comparison between detection results from the ultrasonic sensor 30 and the LIDAR sensor 31 in the traveling apparatus 1 according to the first embodiment shows that detection by the LIDAR sensor 31 has no abnormality and that the ultrasonic sensor 30 is successful in detecting something, there may be an adherent substance on the LIDAR sensor 31, and an alarm may be given.

In addition to the function of the preferential sensor determination unit 53 according to the first embodiment, control may be switched so as to, for example, preferentially drive the ultrasonic sensor 30 in the running direction. Since this configuration shortens a period for sound wave emission, a failure in sensing is unlikely to occur even if responsiveness becomes high and movement speed increases.

Second Embodiment

A second embodiment will next be described with reference to the drawings.

Figure 9:
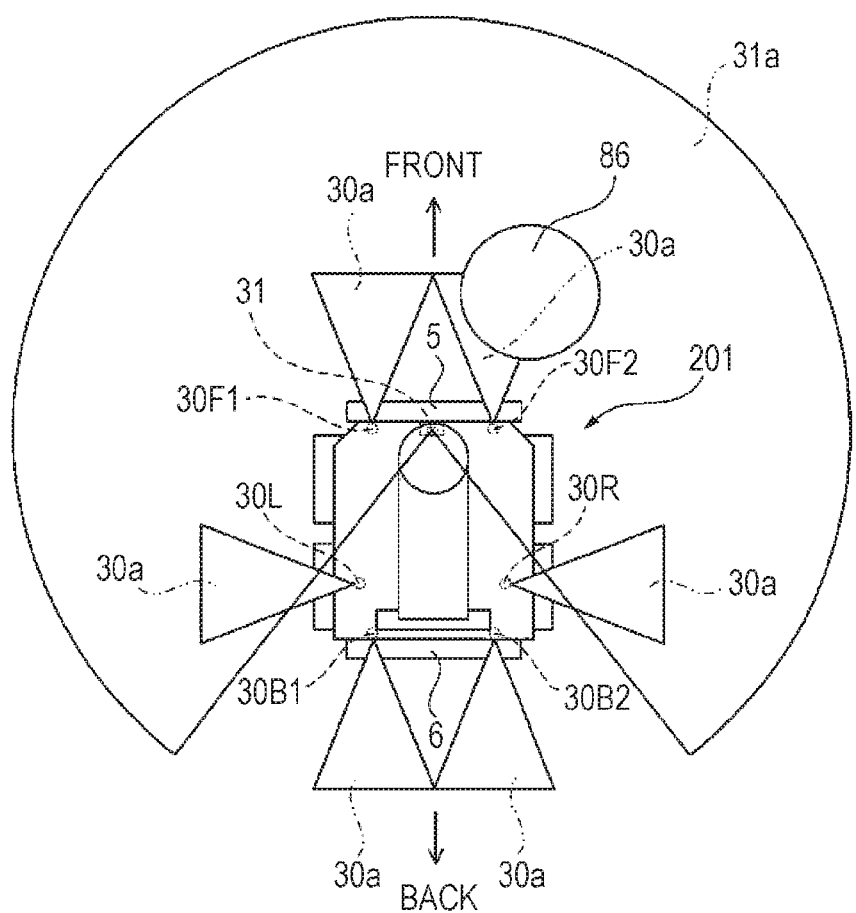
FIG. 9 is an explanatory view showing an example of a state of obstacle detection by ultrasonic sensors and a LIDAR sensor in a traveling apparatus according to a second embodiment.

FIG. 9 is an explanatory view showing an example of a state of obstacle detection by ultrasonic sensors and a LIDAR sensor in a traveling apparatus according to the second embodiment.

Note that the traveling apparatus according to the second embodiment has the same configuration as that of the traveling apparatus according to the first embodiment and is different in control by an obstacle detection device. Same components are denoted by same reference characters, and a description thereof will be omitted.

As shown in FIG. 9, a traveling apparatus 201 according to the second embodiment is characteristically configured to determine the presence or absence of an obstacle on the basis of a detection result from an ultrasonic sensor 30 without using a detection result from a LIDAR sensor 31 if an obstacle 86 which is present within a detection range for the ultrasonic sensor 30 and a detection range for the LIDAR sensor 31 is a transparent substance, such as a substance with a mirror surface or glass.

The LIDAR sensor 31 is incapable of sensing a transparent substance, such as a substance with a mirror surface or glass. If the obstacle 86 present within the detection range for the LIDAR sensor 31 is not detected by the LIDAR sensor 31, the presence or absence of an obstacle is determined by giving priority to a detection result from the ultrasonic sensor 30.

According to the second embodiment with the above-described configuration, if the LIDAR sensor 31 is determined to have no abnormality in a case where the presence of the obstacle 86 detected by an ultrasonic sensor 30F2 within a detection range 31a for the LIDAR sensor 31 is not detected in the traveling apparatus 201, detection action by the ultrasonic sensor 30F2 is preferentially performed. This allows a sensor successful in detecting an obstacle to complement sensing action by a sensor incapable of detecting the obstacle and implementation of efficient sensing.

Third Embodiment

A third embodiment will next be described with reference to the drawings.

Figure 10:
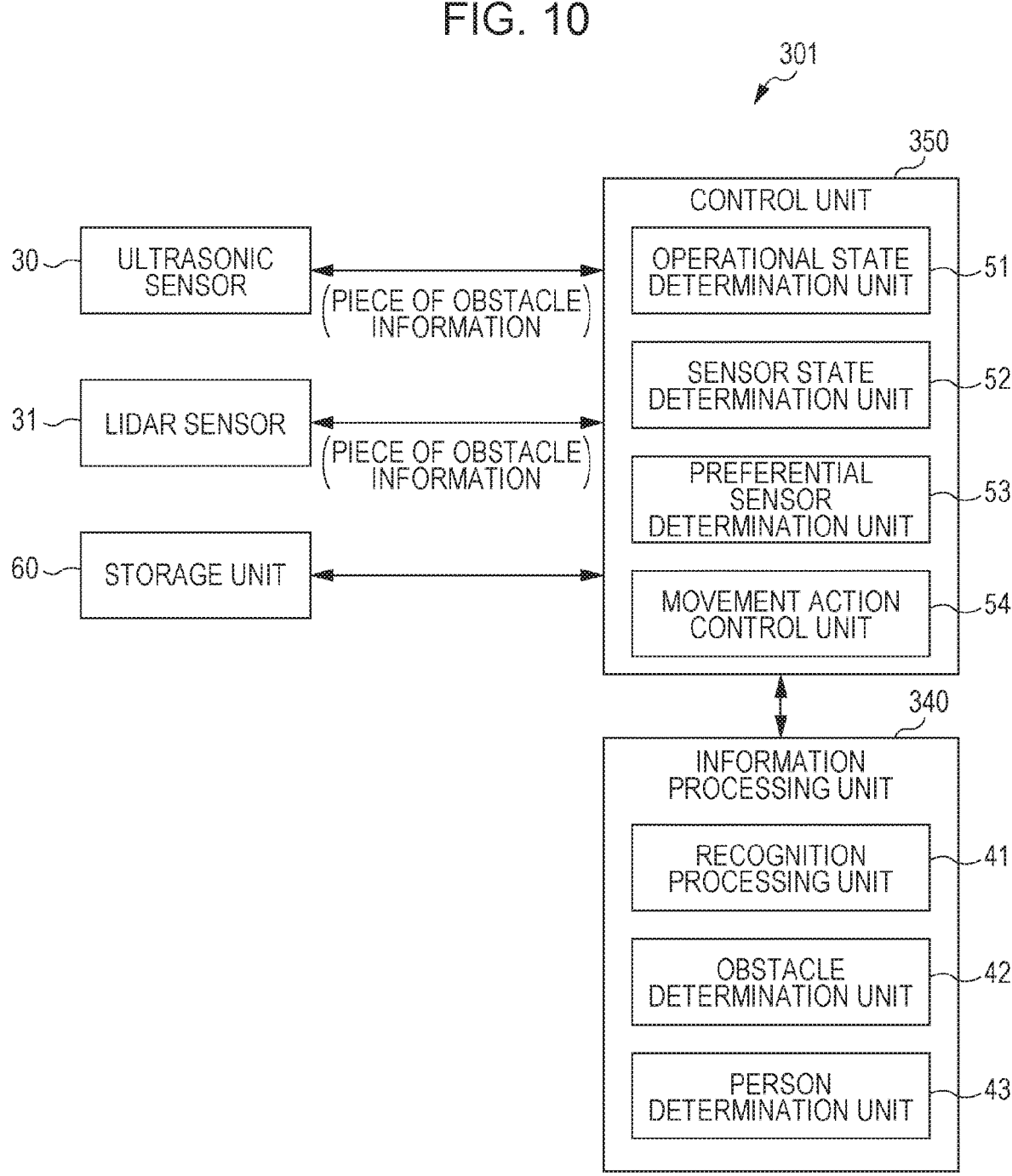
FIG. 10 is a block diagram showing an electrical configuration of a traveling apparatus according to a third embodiment.

FIG. 10 is a block diagram showing an electrical configuration of a traveling apparatus according to the third embodiment.

Note that the traveling apparatus according to the third embodiment has the same basic configuration as that of the traveling apparatus 1 according to the first embodiment and that a description thereof will be omitted.

As shown in FIG. 10, a traveling apparatus 301 according to the third embodiment characteristically has the configuration below in addition to the configuration of the traveling apparatus 1 according to the first embodiment. If a person is detected by an ultrasonic sensor 30 and a LIDAR sensor 31 at the start of detection action by the ultrasonic sensor 30 and the LIDAR sensor 31, and detection of the person is not confirmed by the ultrasonic sensor 30 and the LIDAR sensor 31 after that, it is determined that the person has moved away.

As shown in FIG. 10, the traveling apparatus 301 includes an information processing unit 340 which processes pieces of obstacle information acquired by the ultrasonic sensor 30 and the LIDAR sensor 31, a control unit 350 which controls traveling of the traveling apparatus 301 on the basis of the pieces of obstacle information, and a storage unit 60 which stores pieces of obstacle information acquired by the ultrasonic sensor 30 and the LIDAR sensor 31.

The information processing unit 340 characteristically includes a person determination unit 43 in addition to a recognition processing unit 41 and an obstacle determination unit 42. The person determination unit 43 determines whether an obstacle is a person, on the basis of pieces of information on the obstacle detected by the ultrasonic sensor 30 and the LIDAR sensor 31.

The control unit 350 characteristically includes a movement action control unit 54 in addition to an operational state determination unit 51, a sensor state determination unit 52, and a preferential sensor determination unit 53.

The movement action control unit 54 stops movement action of the traveling apparatus 301 if the person determination unit 43 determines that a person is present within detection regions for the ultrasonic sensor 30 and the LIDAR sensor 31, on the basis of pieces of information detected by the ultrasonic sensor 30 and the LIDAR sensor 31.

According to the third embodiment with the above-described configuration, the traveling apparatus 301 includes the person determination unit 43 as a component of the information processing unit 340 and includes the movement action control unit 54 as a component of the control unit 350. If a person is detected within the detection regions for the ultrasonic sensor 30 and the LIDAR sensor 31 at the start of operation of the traveling apparatus 301, it is determined that the person is in the vicinity of the traveling apparatus 301, and the operation of the traveling apparatus 301 is stopped until the person exits from the detection regions. This allows implementation of provision of the traveling apparatus 301 safe for a person.

The control unit 350 may mask the ultrasonic sensor 30 on a side where a person is present to disable detection until the person exits from a detection region for the ultrasonic sensor 30 on the side where the person is present.

With the above-described configuration, if a person is still not far enough away from the traveling apparatus 301, the person can be inhibited from being erroneously sensed as an obstacle.

Fourth Embodiment

A fourth embodiment will next be described with reference to the drawings.

Figure 11:
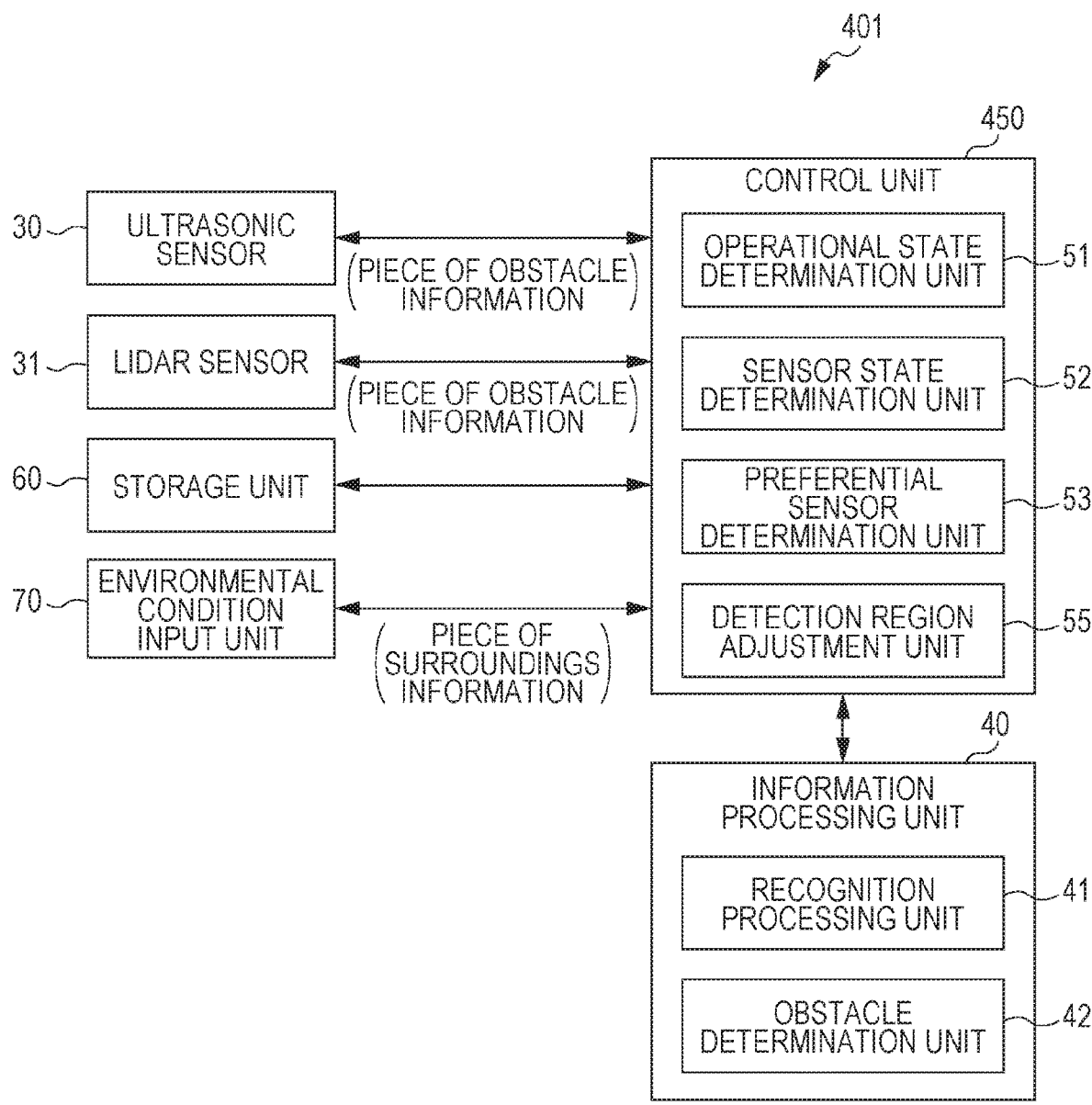
FIG. 11 is a block diagram showing an electrical configuration of a traveling apparatus according to a fourth embodiment.

FIG. 11 is a block diagram showing an electrical configuration of a traveling apparatus according to the fourth embodiment.

Note that the traveling apparatus according to the fourth embodiment has the same basic configuration as that of the traveling apparatus 1 according to the first embodiment and that a description thereof will be omitted.

As shown in FIG. 11, a traveling apparatus 401 according to the fourth embodiment characteristically includes an environmental condition input unit 70 as an information detection unit which detects a traveling state or information on surroundings in addition to components of the traveling apparatus 1 according to the first embodiment such that detection regions for an ultrasonic sensor 30 and a LIDAR sensor 31 are adjustable in accordance with an environmental condition, under which the traveling apparatus 401 is arranged.

The environmental condition input unit 70 is configured such that an environmental condition can be input from a server or a terminal apparatus communicably connected to the traveling apparatus 401. Examples of a possible environmental condition include rainy weather, foggy weather, and snowy weather.

As shown in FIG. 11, the traveling apparatus 401 includes an information processing unit 40 which processes pieces of obstacle information acquired by the ultrasonic sensor 30 and the LIDAR sensor 31, a control unit 450 which controls traveling of the traveling apparatus 401 on the basis of the pieces of obstacle information, and a storage unit 60 which stores pieces of obstacle information acquired by the ultrasonic sensor 30 and the LIDAR sensor 31.

The control unit 450 characteristically includes a detection region adjustment unit 55 in addition to an operational state determination unit 51, a sensor state determination unit 52, and a preferential sensor determination unit 53.

The detection region adjustment unit 55 adjusts the detection region for the ultrasonic sensor 30 on the basis of an environmental condition acquired by the environmental condition input unit 70.

For example, since the LIDAR sensor 31 is affected in the case of rainy weather, foggy weather, or snowy weather, the detection region adjustment unit 55 adjusts the detection region for the ultrasonic sensor 30 to a long detection region. In this case, the detection region for the ultrasonic sensor 30 may be adjusted so as to be longer than the detection region for the LIDAR sensor 31.

Since visibility is good in the case of fine weather, the detection region adjustment unit 55 may adjust the detection region for the LIDAR sensor 31 to a long detection region.

According to the fourth embodiment with the above-described configuration, the traveling apparatus 401 includes the environmental condition input unit 70 and includes the detection region adjustment unit 55 as a component of the control unit 450. This allows the traveling apparatus 401 to adjust the detection regions for the ultrasonic sensor 30 and the LIDAR sensor 31 in accordance with an environmental condition and reliable sensing.

Note that a modification may be such that a CCD camera is used as an information detection unit which detects a road surface condition, a road surface condition is determined by a piece of captured image information from the CCD camera, and settings on the detection regions for the ultrasonic sensor 30 and the LIDAR sensor 31 to be actuated are changed in accordance with a condition of a channel (a road surface), along which the traveling apparatus 401 according to the fourth embodiment travels.

For example, if the channel is narrow, the detection region for the ultrasonic sensor 30 may be set so as to be narrow to reduce effects of reflection from surroundings. For example, if there is a wall on either side of the channel, and it is clear that no person gains entry through the walls, lateral detection may be masked.

In sensing determination processing by the LIDAR sensor 31, a base value for sensing determination may be lowered only for a region including a detection range for the ultrasonic sensor 30 that is incapable of detection. For example, safety of traveling may be supplemented by, for example, reducing a sensing determination size for obstacles to facilitate sensing.

Another modification may be such that settings on the detection regions for the ultrasonic sensor 30 and the LIDAR sensor 31 are changed in accordance with a traveling speed of the traveling apparatus 401 according to the fourth embodiment.

For example, a sensing distance for the ultrasonic sensor 30 in a movement direction may be increased with an increase in the traveling speed of the traveling apparatus 401. Driving of the ultrasonic sensor 30 in a direction other than the movement direction may be stopped or the sensing distance may be shortened.

If traveling is based only on a piece of information from the LIDAR sensor 31, the traveling may be performed at a reduced speed.

Note that although a traveling apparatus is configured to be capable of autonomous traveling in each of the above-described embodiments, for example, a control unit may be provided in an external server, and a traveling apparatus may be configured to perform traveling operation in accordance with an instruction from the external server.

Although the above-described embodiments have each been described taking as an example a case where a traveling apparatus is applied to an autonomous traveling vehicle functioning as a security patrolling robot, the traveling apparatus may, of course, be applied to any other traveling apparatus. For example, the traveling apparatus may be applied to an apparatus, such as an automatic transport apparatus, a patrol vehicle, a home delivery robot, or a driverless farm machine.

The present disclosure is not limited to the embodiments described above and may be embodied with various modifications within the scope disclosed in the appended claims. That is, embodiments obtained by combination of technical measures modified appropriately within the scope disclosed in the appended claims are also encompassed by the technical scope of the present disclosure.

The present disclosure is not limited to the embodiments described above and may be embodied with various modifications within the scope disclosed in the appended claims. That is, embodiments obtained by combination of technical measures modified appropriately without departing from the purport of the present disclosure are also encompassed by the technical scope of the present disclosure.

The present disclosure contains subject matter related to that disclosed in Japanese Priority Patent Application JP 2017-052601 filed in the Japan Patent Office on Mar. 17, 2017, the entire contents of which are hereby incorporated by reference.

What is claimed is:

1. An obstacle detection device mounted on a traveling apparatus, the obstacle detection device comprising:
   an obstacle detection unit configured to detect an obstacle; and
   a control unit configured to control detection by the obstacle detection unit, wherein
   the obstacle detection unit includes a first obstacle detection unit configured to detect an obstacle within a predetermined range and a second obstacle detection unit configured to detect an obstacle within a predetermined range through detection processing different from detection processing by the first obstacle detection unit,
   the first obstacle detection unit and the second obstacle detection unit are arranged such that a part of a detection range for the first obstacle detection unit and a part of a detection range for the second obstacle detection unit overlap with each other,
   the control unit determines whether there is an adherent substance on the first obstacle detection unit,
   the control unit determines whether there is an adherent substance on the second obstacle detection unit, and
   if the control unit determines that there is the adherent substance on one obstacle detection unit between the first obstacle detection unit and the second obstacle detection unit and determines that there is not the adherent substance on the other obstacle detection unit, then the control unit determines a presence or an absence of the obstacle in a region which is undetectable by the one obstacle detection unit using a detection result from the other obstacle detection unit and without using a detection result from the one obstacle detection unit.

2. The obstacle detection device according to claim 1, wherein
the first obstacle detection unit is an ultrasonic sensor, and
the second obstacle detection unit is an optical sensor.

3. The obstacle detection device according to claim 1, wherein
the control unit sets a base value for determining presence or absence of an obstacle on the basis of the detection result from the other obstacle detection unit to a value lower than a value set in advance for a range, within which the one obstacle detection unit is incapable of detection.

4. The obstacle detection device according to claim 1, wherein
the control unit determines there is the adherent substance on the one obstacle detection unit if a noise occurs at a predetermined distance in the detection processing by the one obstacle detection unit and the noise does not occur at a predetermined distance in the detection processing by the other obstacle detection unit.

5. The obstacle detection device according to claim 1, wherein
if a person is detected at the start of detection by the obstacle detection unit, the control unit stops a movement action of the traveling apparatus.

6. The obstacle detection device according to claim 1, wherein
the first obstacle detection unit includes a plurality of first obstacle detection units which are arranged around the traveling apparatus, and
the control unit sets a period of sound wave emission of the first obstacle detection units which perform detection for a running direction to be shorter than a period of sound wave emission of the first obstacle detection units which do not perform detection for the running direction during traveling of the traveling apparatus.

7. An obstacle detection device mounted on a traveling apparatus, the obstacle detection device comprising:
an obstacle detection unit configured to detect an obstacle;
a control unit configured to control detection by the obstacle detection unit; and
an information detection unit configured to detect a traveling state or information on surroundings, wherein
the obstacle detection unit includes a first obstacle detection unit configured to detect an obstacle within a predetermined range and a second obstacle detection unit configured to detect an obstacle within a predetermined range through detection processing different from detection processing by the first obstacle detection unit,
the first obstacle detection unit and the second obstacle detection unit are arranged such that a part of a detection range for the first obstacle detection unit and a part of a detection range for the second obstacle detection unit overlap with each other,
the control unit determines whether there is an adherent substance on the first obstacle detection unit,
the control unit determines whether there is an adherent substance on the second obstacle detection unit, and
if the control unit determines that there is the adherent substance on one obstacle detection unit between the first obstacle detection unit and the second obstacle detection unit and determines that there is not the adherent substance on the other obstacle detection unit, then the control unit determines a presence or an absence of the obstacle in a region which is undetectable by the one obstacle detection unit using a detection result from the information detection unit and without using a detection result from the one obstacle detection unit.

8. The obstacle detection device according to claim 7, wherein
the information detection unit detects a road surface condition of a traveling channel, along which the traveling apparatus travels,
the first obstacle detection unit is an ultrasonic sensor,
the second obstacle detection unit is an optical sensor, and
the control unit changes detection regions for the second obstacle detection unit according to the road surface condition detected by the information detection unit.

9. The obstacle detection device according to claim 7, wherein
the information detection unit detects a traveling speed of the traveling apparatus,
the first obstacle detection unit is an ultrasonic sensor,
the second obstacle detection unit is an optical sensor, and
the control unit changes detection regions for the second obstacle detection unit according to the traveling speed of the traveling apparatus.

10. The obstacle detection device according to claim 7, wherein
the information detection unit detects a piece of weather information,
the first obstacle detection unit is an ultrasonic sensor,
the second obstacle detection unit is an optical sensor, and
the control unit acquires the piece of weather information, and adjusts a sensing distance for the first obstacle detection unit to be longer than a sensing distance of the second obstacle detection unit if weather has low visibility.

11. A traveling apparatus having a mounted obstacle detection device including an obstacle detection unit configured to detect an obstacle and a control unit configured to control detection by the obstacle detection unit, wherein
the obstacle detection device according to claim 1 is used as the obstacle detection device.

12. An obstacle detection system using an external server and a traveling apparatus having a mounted obstacle detection device including an obstacle detection unit configured to detect an obstacle in surroundings of the apparatus, wherein
the obstacle detection device is controlled so as to perform detection in accordance with an instruction from the external server,
the obstacle detection unit includes a first obstacle detection unit configured to detect an obstacle within a predetermined range and a second obstacle detection unit configured to detect an obstacle within a predetermined range through detection processing different from detection processing by the first obstacle detection unit,
the first obstacle detection unit and the second obstacle detection unit are arranged such that a part of a detection range for the first obstacle detection unit and a part of a detection range for the second obstacle detection unit overlap with each other,
the external server includes a control unit configured to control detection by the obstacle detection unit,
the control unit determines whether there is an adherent substance on the first obstacle detection unit, the control unit determines whether there is an adherent substance on the second obstacle detection unit, and if the control unit determines that there is the adherent substance on one obstacle detection unit between the first obstacle detection unit and the second obstacle detection unit and determines that there is not the adherent substance on the other obstacle detection unit, then the control unit determines a presence or an absence of the obstacle in a region which is undetectable by the one obstacle detection unit using a detection result from the other obstacle detection unit and without using a detection result from the one obstacle detection unit.

13. An obstacle detection method in an obstacle detection device which is mounted on a traveling apparatus and detects an obstacle in surroundings of the traveling apparatus, the obstacle detection method comprising:

a first obstacle detection process of detecting an obstacle within a predetermined range;

a second obstacle detection process of detecting an obstacle within a predetermined range through detection processing different from detection processing in the first obstacle detection process;

a process of arranging a detection range for the first obstacle detection process and a detection range for the second obstacle detection process such that a part of the detection range for the first obstacle detection process and a part of the detection range for the second obstacle detection process overlap with each other;

a process of determining whether there is an adherent substance on the first obstacle detection unit;

a process of determining whether there is an adherent substance on the second obstacle detection unit; and a process of determining a presence or an absence of the obstacle in a region which is undetectable by one obstacle detection process between the first obstacle detection process and the second obstacle detection process using a detection result from the other obstacle detection process and without using a detection result of the one obstacle detection process, when it is determined that there is the adherent substance based on the detection result of the one obstacle detection process and it is determined that there is not the adherent substance based on the detection result of the other obstacle detection process.

* * * * *